Figure 1:
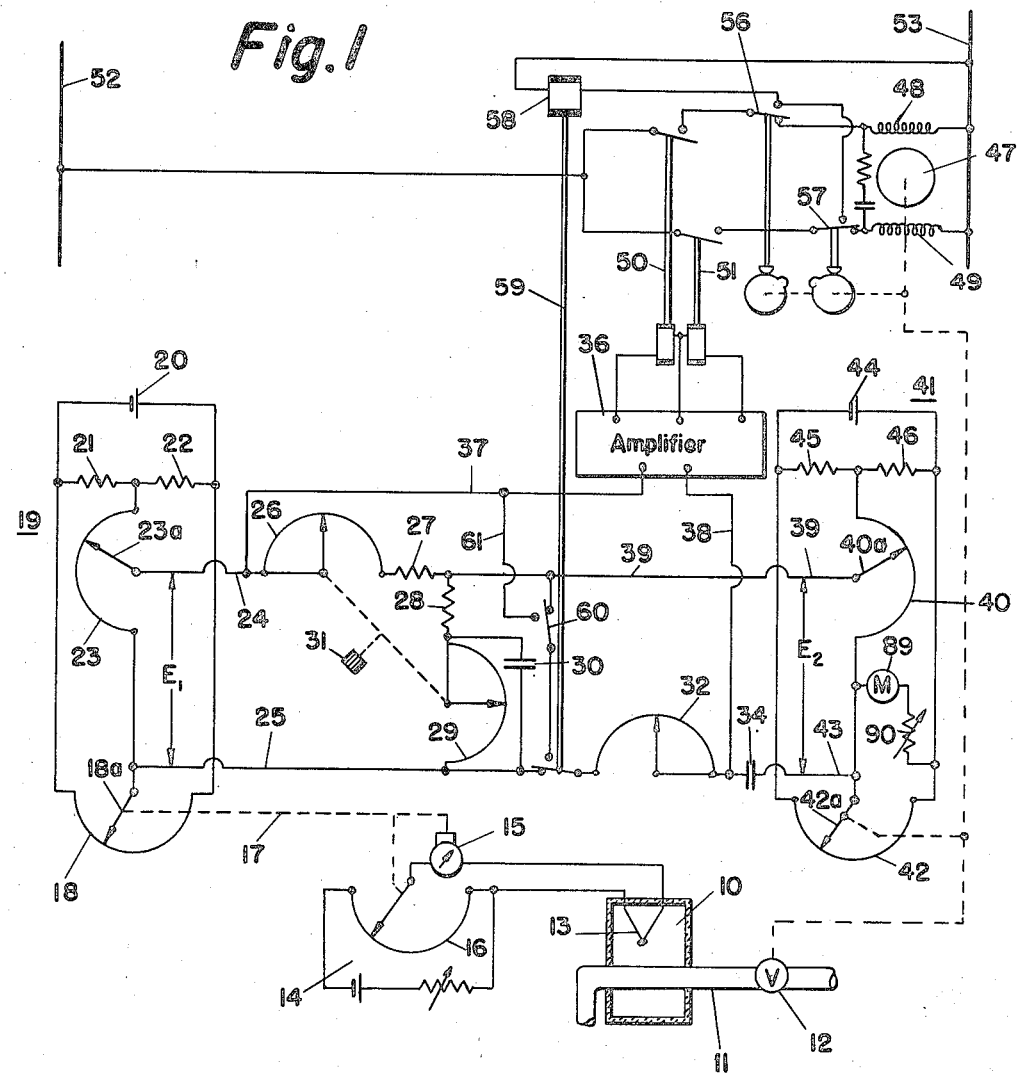

April 8, 1958     E. T. DAVIS     2,830,244
REBALANCEABLE CONTROL SYSTEM

Filed Sept. 2, 1955     3 Sheets—Sheet 1

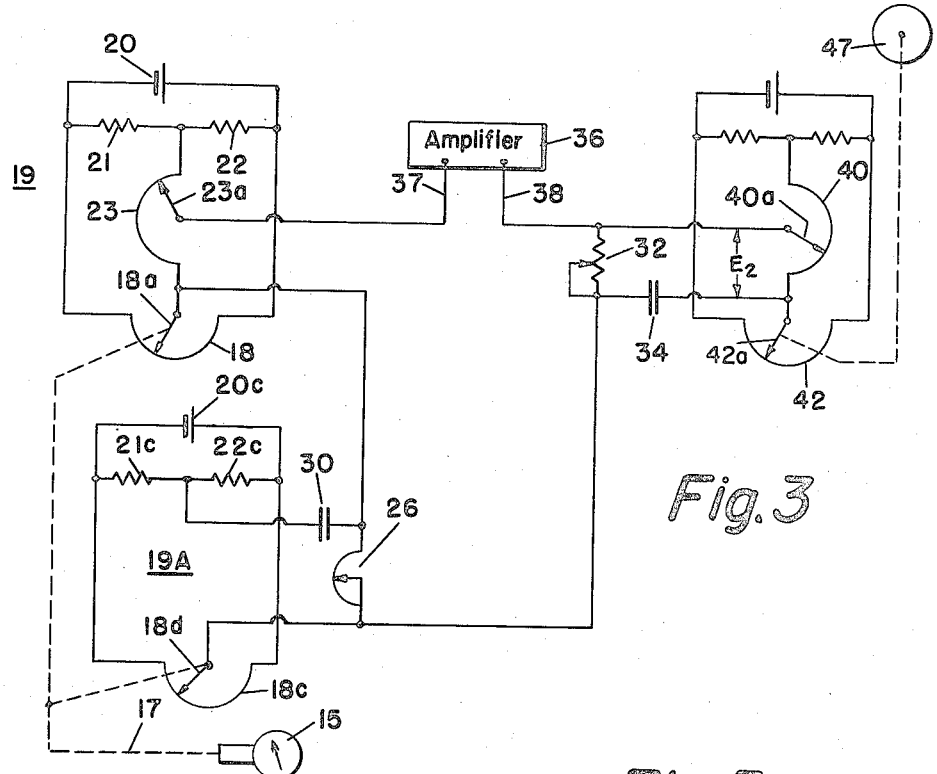
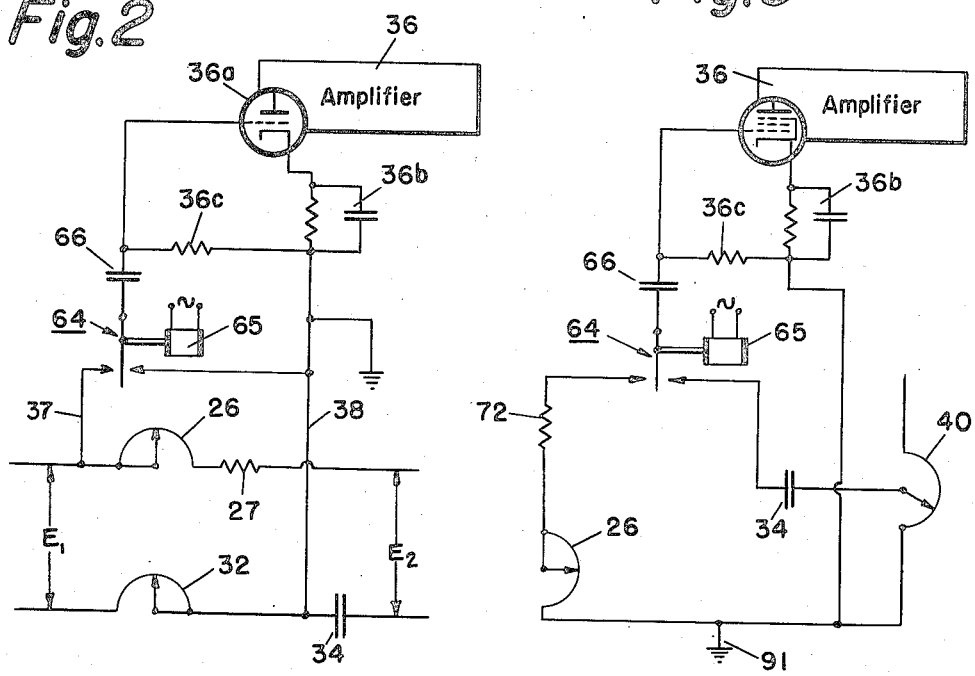

United States Patent Office 2,830,244
Patented Apr. 8, 1958

2,830,244

REBALANCEABLE CONTROL SYSTEM

Elwood T. Davis, Havertown, Pa., assignor to Leeds and Northrup Company, Philadelphia, Pa., a corporation of Pennsylvania Application September 2, 1955, Serial No. 532,161

13 Claims. (Cl. 318—28)

This invention relates to automatic control systems of the type disclosed in my Patent No. 2,666,170 and has for an object the provision of an improved and simplified system which by reason of the cooperation and disposition of the elements thereof provides an independence of the several control actions.

In a control system incorporating multiple control functions, it is desirable to have each of them adjustable in magnitude without effect upon the others. For example, if there are three components involved in the control and each can be adjusted independently of the other, there is attained complete flexibility so that the strength of one response may be made as strong or as weak as desired without effect upon the preselection of the magnitude or strength of the other responses. In accordance with the present invention, rate action has no effect on either the proportional action or the reset action, and the latter may be adjusted independently of rate action to meet the requirements of widely differing process requirements.

While independent voltage sources and associated networks may be provided for each component of control action, in the preferred form of the invention a minimum of circuit components are provided, while retaining the independence of adjustment of the rate and reset signals.

In carrying out the invention in a preferred form thereof, the magnitude of a condition-controlling effect is regulated to maintain the magnitude of a condition or controlled variable at a predetermined value by means of control actions of the kind discussed above. The magnitude of the proportional action is determined as a function of the magnitude of the change of the condition and by means of a control signal of magnitude related to the deviation of the condition from a predetermined value. Circuit means are provided for producing a second signal proportional to the rate of change of the condition. This circuit means may be independent of that provided for proportional action or, in the preferred form, it may function to produce from the first control signal a second signal proportional to the deviation and a third signal proportional to the rate of change of the deviation. Throughout the normal operating range, the circuit is maintained in balance by a feedback signal whose magnitude is responsive to change in the magnitude of the condition-controlling effect. The foregoing signals are applied to a loop circuit connected to the input terminals of an amplifier with the feedback signal controlled in magnitude in accordance with the output of said amplifier.

Figure 4:
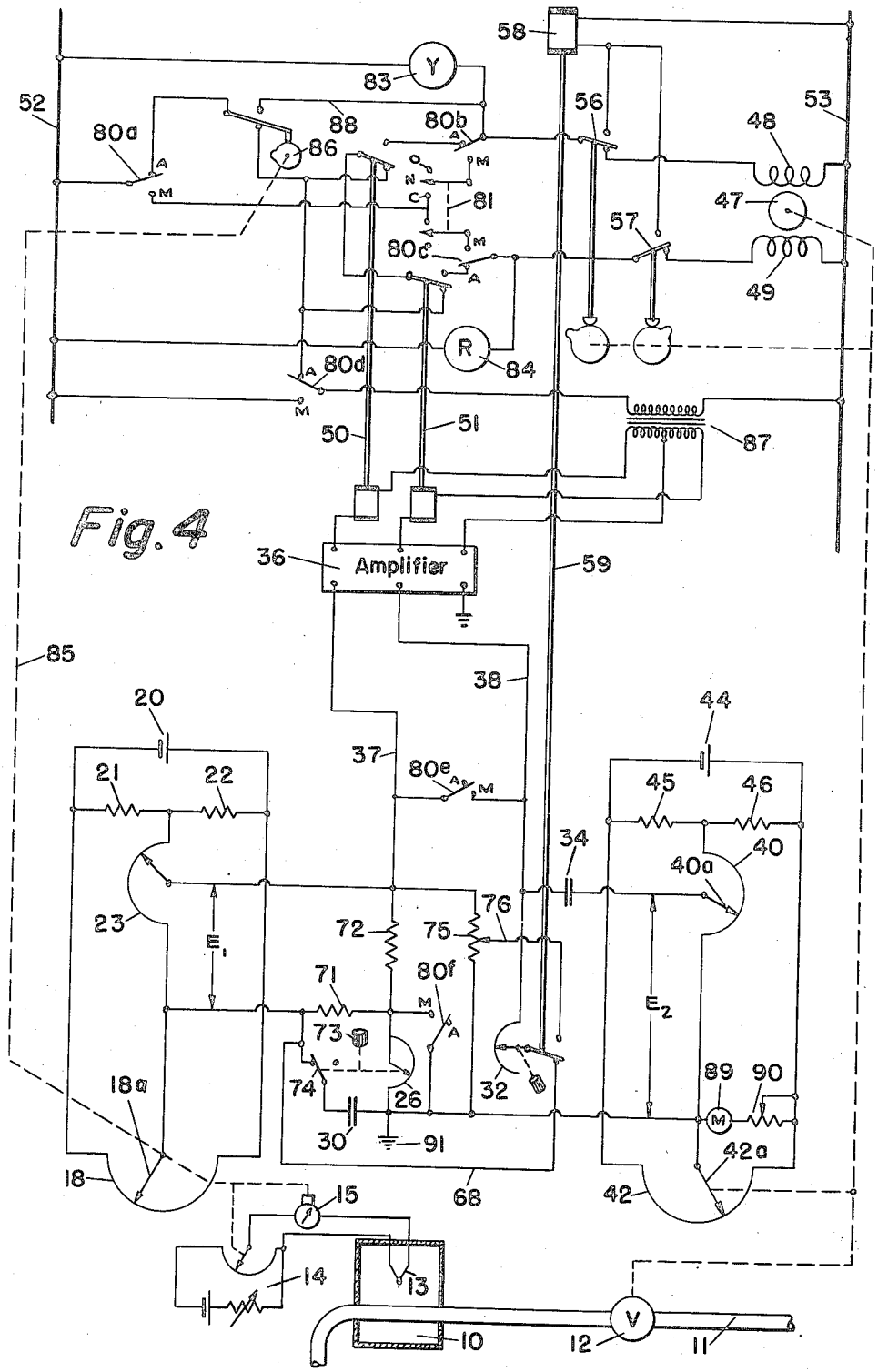

For further objects and advantages of the invention, reference is to be had to the following detailed description taken in conjunction with the accompanying drawings, in which:

Fig. 1 diagrammatically illustrates a system embodying the invention;

Fig. 2 diagrammatically illustrates a part of the system of Fig. 1 showing in somewhat more detail the input connections to the amplifier;

Fig. 3 is a modification of Fig. 1;

Fig. 4 diagrammatically illustrates the system of Fig. 1 with additional features added thereto; and Fig. 5 diagrammatically illustrates more in detail a part of the system of Fig. 4 including the input circuit to the amplifier.

Referring to Fig. 1, the invention in one form has been shown as applied to the control of the magnitude of a condition which is illustrated as the temperature of a furnace or heat-treating device represented by a compartment or chamber 10 through which there extends a heat-transferring coil 11, the heating medium thereof being under the control of the final control element of the system and which is shown as a valve 12. A thermocouple 13 subject to the temperature within the chamber 10 applies a voltage to the measuring circuit 14. A circuit-adjusting means 15 serves not only to balance the voltage developed by the thermocouple as by adjustment of a slidewire resistor 16 in the potentiometer measuring circuit 14, but also serves through mechanical connection 17 relatively to adjust a slidewire 18 with respect to its contact 18a. While in Fig. 1 the contact 18a has been illustrated as adjustable, it is to be understood that in practice the slidewire 18 may be rotated relative to the stationary contact 18a. The adjusting means or device 15 is preferably of the electronic type, such as shown in Williams Patent No. 2,113,164. However, it may be of the mechanical type as illustrated in Squibb Patent No. 1,935,732. In general, it will have associated with it a scale and an index, and generally a chart including a pen for presenting a continuous indication of temperature and a record of that temperature recorded against time.

Slidewire 18 is included in a control network 19 having a constant-voltage source of supply indicated at 20 connected across equal-valued resistors 21 and 22. A circuit from the juncture of these resistors extends by way of a slidewire 23 to the movable contact 18a of slidewire 18. Accordingly, there is developed across output conductors 24 and 25 a voltage $E_1$ having a magnitude and polarity proportional to the extent of deviation of the magnitude of the condition from a predetermined value and of a polarity dependent upon the direction of deviation of said magnitude from said predetermined value. When the magnitude of the condition is at the control point, the contact 18a will be midway of the resistance of the slidewire 18 and voltage $E_1$ will be zero. The magnitude at which the condition is to be maintained, i. e., the control point, may be varied by bodily moving the slidewire 18 about the axis of rotation of contact 18a. The slidewire 18 is thereafter held stationary in its new position.

In accordance with the present invention, the voltage $E_1$ proportional to the extent of deviation of the temperature from the control point is divided into two components by means of resistors 26—29 and a capacitor 30. It will be apparent that the voltage $E_1$ will be subdivided across the aforesaid resistors. They form a voltage divider, and the voltage appearing across the resistors 26 and 27 is representative of a proportional control action and a rate control action. Since the potential difference across resistors 26 and 27 is under static conditions directly related to the magnitude of the voltage $E_1$, it will be apparent that said potential difference is representative of the proportional action. When the voltage $E_1$ is changing, current will flow through the capacitor 30, and the magnitude of that current flow will be dependent upon the rate of change of the voltage $E_1$, i. e., the rate of change of magnitude of the condition under control, such as the temperature of compartment 10. Accordingly, the potential difference across resistors 26 and 27 will include a component due to the charging or discharging current of capacitor 30, and thus there will be present a component representative of rate action.

The control system also includes a reset resistor 32 and a reset capacitor 34. For the moment it will be assumed that the reset capacitor 34 is short-circuited, thus eliminating from the operation of the system a component producing a reset control action. The potential difference across resistors 26 and 27 representative of the proportional and rate actions is included in the input circuit to an amplifier 36 by way of an input conductor 37. The input circuit can be traced from one side of the amplifier 36 by way of conductor 37, the resistors 26 and 27, a conductor 39, a slidewire 40 in a control network 41 shown as of the bridge type, a slidewire 42 and by way of conductor 43 to conductor 38 forming the other side of the input circuit to the amplifier 36. Capacitor 34 is not included in this circuit by reason of the assumption it has been removed from the circuit as by short-circuiting the same. As a result of the circuit connections to the input circuit of the amplifier, a voltage $E_2$ developed across conductors 39 and 43 is included in the input circuit. It has a magnitude and polarity opposing and balancing the potential difference developed across resistors 26 and 27. The voltage $E_2$ is derived from a constant-voltage source 44 connected across resistors 45 and 46 which may be of equal value, though not required to be. A potentiometer in the form of a slidewire 40 is connected to the juncture between resistors 45 and 46 and to the movable contact of slidewire 42.

The movable contact of slidewire 42 is adjusted in accordance with the output of the amplifier 36 and thus develops the voltage $E_2$ as a feedback signal from the amplifier. The adjustment is accomplished by means of a reversible motor 47 having field windings 48 and 49 and direction-controlling contactors 50 and 51 selectively energized by the amplifier 36 in order to maintain its input at balance.

By deriving both the proportional component of control action and the rate component of control action directly from the network 19, the system responds immediately in accordance with the change and the rate of change of the controlled variable. There may be achieved an immediate rate response in contrast with a delayed response found necessary for stability reasons in systems where the rate action is derived from the feedback signal or as a result of the change in position of the final control element shown as the valve 12.

In order to adjust the magnitude of the rate action without affecting the magnitude of the proportional action, the resistors 26 and 29 are shown as rheostats ganged together for simultaneous operation as by an adjusting knob 31. As the resistor 26 is increased in resistance, so is the resistor 29. Accordingly, the ratio of the sum of resistors 26 and 27 with respect to resistors 28 and 29 is maintained constant. As a result, the fraction of the voltage $E_1$ which appears across resistors 26 and 27 included in the loop in the input circuit to the amplifier 36 remains constant, though resistors 26 and 29 be wholly included or excluded from their respective circuits. Stated differently, resistors 26 and 29 are adjusted so that the ratio between the static voltage divider comprised of resistors 27 and 28 is unaffected by adjustment of resistors 26 and 29. As resistor 26 is changed in value, the magnitude of the rate action is changed. Thus, as resistor 26 is increased in value, the rate action will be increased. This will be obvious inasmuch as the component of current due to the charging or discharging of capacitor 30 will produce a larger potential difference across resistors 26 and 27 in the input circuit of the amplifier. Conversely, by decreasing the value of resistor 26 the magnitude of the rate action will be decreased. Thus the rate action may be adjusted quite independently of the proportional action.

The magnitude of the proportional action is adjusted by movement of the contact 23a of slidewire 23 to predetermine the magnitude of the voltage $E_1$ for a given change in the position of slidewire contact 18a. Similarly, to control the magnitude of the proportional action, the magnitude of the feedback signal may be predetermined by adjustment of the position of slidewire contact 40a relative to slidewire 40 to increase or decrease the value of voltage $E_2$ for a given setting of the contact 42a of slidewire 42. In many instances, it will be desirable to gang together the contacts 23a and 40a for simultaneously adjusting the values of voltages $E_1$ and $E_2$. The contacts 23a and 40a will be moved in opposite directions to increase the voltage $E_1$ and to decrease the voltage $E_2$ to increase the component of proportional action, and vice versa to decrease the component of proportional action.

In the foregoing description it was assumed that the reset capacitor 34 was short-circuited. The operation of the system as a whole will now be briefly reviewed with the reset capacitor 34 effective in the circuit as illustrated.

If the temperature of the compartment 10 is rising, the detector 15 will adjust the contact 18a in accordance with the said change of temperature. Thus the voltage $E_1$ will be changing in correspondence with the rise of temperature at compartment 10. A fraction of the voltage $E_1$, of course, appears across resistors 26 and 27 and is representative of the deviation of the temperature from the control point. This provides the component of proportional action and represents an unbalance voltage in the input circuit of the amplifier. Thus the amplifier due to proportional action alone will produce energization of the motor 47 connected to supply lines 52 and 53 for adjustment of the contact of slidewire 42 to restore voltage balance at the input of the amplifier.

The rate of change of the voltage $E_1$ due to the current flow through capacitor 30 produces across resistors 26 and 27 a component of rate action which is superimposed upon the proportional action and thus varies the extent of adjustment of contact 42a by motor 47 to maintain voltage balance at the input circuit of the amplifier.

By reason of the inclusion of reset resistor 32 and reset capacitor 34, contact 42a will be adjusted by motor 47 as long as the temperature of the compartment 10 is away from the control point. This will be understood by assuming that the temperature of compartment 10 for a short interval remains constant at a value displaced from the control point. As soon as this occurs, the voltage $E_1$ is no longer changing. However, in order for the potential difference across resistor 32 to be maintained equal and opposite to voltage $E_1$, current must flow through resistor 32 and capacitor 34 of magnitude sufficient to produce across resistor 32 a potential difference equal in magnitude to voltage $E_1$. This flow of current, proportional in magnitude to voltage $E_1$, results in a building up of a potential difference across capacitor 34 at a uniform rate. Accordingly, voltage $E_2$ must increase at the same rate in order to maintain the current through resistor 32 constant and a voltage balance at the input to amplifier 36. Thus, though voltage $E_1$ be at a constant value, voltage $E_2$ will be changing to maintain a voltage balance at the input of the amplifier, and voltage $E_2$ will be changing by reason of the action of the motor 47 in adjusting contact 42a which, of course, adjusts the final control element 12.

Stated mathematically, the adjustment of the final control element 12 due to the reset action will be in accordance with the time integral of the deviation of the temperature of the compartment 10 from the control point. Since the charge which is accumulating on the capacitor 34, as described above, will then be changing at a rate related to the proportional action, that proportional action, of course, having a magnitude related to the value of the voltage $E_1$.

It will be observed that the loop circuit including the reset resistor 32 does not include the loop circuit including the proportional and rate resistors 26 and 27. Accordingly, adjustment of the magnitude of resistor 32 will be effective in changing the magnitude of the reset action without affecting the magnitude of the rate action. However, the reset action will be related to the magnitude of the proportional action as indicated above, although wholly independent of rate action.

In the event the valve 12 is operated to either limit of adjustment, one or the other of limit switches 56 and 57 will be operated to deenergize the motor and to complete a circuit for the operating coil 58 of a relay 59. The single-pole double-throw contacts of relay 59 then serve to interrupt the circuit between the voltage $E_1$ and reset resistor 32 and they also serve to complete a circuit from resistor 32 through a single-pole, double-throw switch 60 to conductor 39 so that the charge on reset capacitor 34 will be determined solely by the magnitude of the voltage $E_2$. By thus limiting the voltage which may be acquired by the reset capacitor 34 to the magnitude of voltage $E_2$, the system will be returned to operation within the proportional band upon or prior to attainment of the control point. It will be observed that with the circuit transfer means or switch 60 in its illustrated position, the input circuit to the amplifier extends by way of conductor 37 and includes resistors 26 and 27 therein in series with the reset resistor 32. Accordingly, while the charging circuit for the reset capacitor 34 does not include resistors 26 and 27, the voltage developed across them in conjunction with the potential difference across reset resistor 32, if any, determines the operation of the amplifier to energize the motor 47 for reverse operation. This occurs as the condition, the temperature of compartment 10, approaches the control point. The inclusion of the rate action advances the time at which the motor 47 is energized and prior to attainment of the control point by the temperature of compartment 10.

With the manually operable single-pole, double-throw switch 60 in its left-hand position, the charging circuit for the capacitor 34 is then traced by way of resistor 32, by way of conductor 61 to the left-hand side of resistor 26. It extends through resistor 27 and by way of conductor 39 to the other side of the source $E_2$. It will be further observed that the conductor 61 through switch 60 and contacts of a circuit-transfer means or relay 59 connects reset resistor 32 directly across the input circuit of the amplifier 36. Accordingly, the potential difference across resistor 32 will primarily determine the operation of the amplifier.

As a result of the foregoing, as the charge on capacitor 34 changes, its potential difference approaches the algebraic sum of the magnitude of the potential difference $E_2$ and the potential difference across resistors 26 and 27. As the polarity of the potential difference across resistors 26 and 27 is opposite to that of potential difference $E_2$ in the loop circuit including reset capacitor 34, the potential difference across capacitor 34 will approach a value which is less than it was when the switch 60 was in its illustrated position. As the potential difference across capacitor 34 approaches said algebraic sum, the current through resistor 32 and the input signal to the amplifier 36 approach zero. As this occurs, one or the other of contactors 50 and 51 is deenergized, which opens the circuit for the operating coil 58 to deenergize relay 59. The resultant closure of its contacts connects potential difference $E_1$ in circuit with potential difference $E_2$ to develop at the input of the amplifier 36 an input signal. This signal will gradually increase to reclose one or the other of contactors 50 and 51 again to energize relay coil 58. This cycling will continue at relatively low rate, maintaining the potential difference of capacitor 34 at or very near to the algebraic sum of $E_2$ and the potential difference across resistors 26 and 27 until the magnitude of the condition or temperature of the compartment 10 is changing toward the control point. As it approaches the control point and dependent upon the rate of change toward the control point, the input signal to the amplifier 36 will energize that one of contactors 50 and 51 which will energize the motor 47 in a direction to move the valve 12 from its previously attained limit of operation. In this manner, the magnitude of the condition is again under the control of the system, and it is regulated in accordance with the combined proportional, rate and reset actions previously described.

The amplifier 36 is of more or less conventional design, and in Fig. 2 only part of the input circuit has been illustrated. It includes the conductors 37 and 38 respectively connected to stationary contacts of a converter 64 having a movable contact which is operated at line frequency, ordinarily 60 cycles per second, between the stationary contacts as by an operating coil 65 energized from a suitable source of alternating-current supply. The input stage 36a of the amplifier includes a cathode-biasing circuit 36b and a grid resistor 36c.

With the movable contact engaging the left-hand stationary contact, there is applied to a coupling capacitor 66, the algebraic sum of the voltages across the input conductors 37 and 38. With the movable contact in its right-hand position, the coupling capacitor 66 is discharged directly to ground. Thus the amplifier will respond to any difference voltage in the input circuit thereto and will through its output connections energize one or the other of the contactors 50 and 51 as illustrated in Fig. 1.

In the modification of Fig. 3, the reset resistor 32 has been illustrated in shunt with capacitor 34 and that part of the resistor 40 which develops the voltage $E_2$. A separate control network 19A shown as of the bridge type having components corresponding with those of bridge network 19, which are identified with the same reference characters with the addition of the subscript "c" or "d," is utilized to produce only a rate action component by the development of a potential difference across the rate resistor 26 which, it will be observed, is included in the input circuit to the amplifier 36. By providing the two networks 19 and 19A, the voltage applied to the input circuit from the network 19 may be solely representative of the deviation of the condition from the control point and introduces a proportional control action. Thus both the proportional and rate actions are developed independently of each other and both directly from deviation of the condition as reflected by the operation of the detector 15 in the adjustment of slidewire contacts 18a and 18d of networks 19 and 19A.

The magnitude of the rate action is determined directly by the setting of the movable contact of rate resistor 26 and the magnitude of the proportional action determined by the setting of slidewire contact 23a, preferably in conjunction with the setting of slidewire contact 40a of slidewire 40.

With the slidewire contact 42a operating within its normal range, the rate of charge or discharge of capacitor 34 is dependent solely upon the voltage $E_2$ which reflects the adjustment of slidewire contact 42a in response to both proportional action and rate action. This differs from the arrangement of Fig. 1 in which the effect of the rate action on the charging of capacitor 34 is removed by inclusion in the charging circuit therefor the resistors 26 and 27 which have developed across them a potential difference including a rate component.

An advantage of the system of Fig. 3 in having the charge on the reset capacitor 34 determined in part by the rate action is that not only does the control operate to move the contact 42a from a limit position prior to attainment of the control point by the condition under control, but also the charge on reset capacitor 34 may be reduced sufficiently for the contact 42a and valve 12 to be moved a substantial amount from their limit position due to this effect. This often avoids entirely overshoot of the control point by the magnitude of the condition under control. It will be noted that this advantage is accomplished without requiring a rate of approach relay, such as relay 59 of Fig. 1.

In the modification of Fig. 4 there are retained the advantages of Fig. 1, particularly the connection of the reset resistor 32 directly in series, as by way of a conductor 68 in series with the potential difference $E_1$, in the input circuit 37, 38 of the amplifier 36. In this manner, there is retained maximum reset sensitivity, i. e., a return of the controlled variable to the control point within the limits of sensitivity of the amplifier and to a closer approximation to the control point than would be the case if the reset resistor 32 were connected in the input circuit in series with only a fraction of the potential difference $E_1$ representative of proportional action.

In Fig. 4 there has been illustrated the voltage divider 71, 72 forming a part of the subject matter of a copending application, Serial No. 532,294, filed concurrently herewith by the applicant and his co-inventor, Henry A. Kalina. As explained in said copending application, approximately one-tenth of the voltage $E_1$ is developed across the resistor 72 in series with the rate resistor 26. The remaining fraction of the voltage $E_1$ is developed across resistor 71 and is effective in conjunction with capacitor 30 to introduce the rate action to the input circuit of the amplifier by way of the rate resistor 26. When the rate resistor 26 is excluded from the circuit as by the knob 73, the rate capacitor 30 is removed from the circuit by the opening of switch contact 74.

In Fig. 4 potentiometer in the form of resistor 75 has a movable contact 76 adjustable to select a desired fraction of the potential difference developed across rate resistor 26 and resistor 72 for inclusion in the rate of approach circuit completed upon operation of the circuit-transfer means or relay 59 as the valve 12 reaches one or the other limits of operation. In this manner, there is provided in accordance with the present invention, continuous adjustment of the rate of approach action to any desired value instead of the two-position adjustment of Fig. 1.

In accordance with the present invention the valve 12 may be moved to any desired position under manual control, with return of the system to automatic control with a minimum of change in position of valve 12 due solely to the transfer from manual to automatic. When manual control is desired, a transfer switch having a plurality of contacts 80a—80f are moved from their automatic or "A" positions to their manual or "M" positions. A double-pole switch 81 can then be operated from its neutral or "N" position to its upper or "O" position for energization of the motor winding 49 for operation of the motor 47 in a direction to open the valve. With the switch 81 in its lower or "C" position, the motor winding 48 is energized for rotation of the motor 47 in a direction to close the valve 12. Signal lights are provided, a yellow light 83 being deenergized each time the motor is energized to close the valve. A red signal light 84 is deenergized each time the motor 47 is energized to open the valve. The signal lights function during both automatic and manual control. While the system is on manual control, the input to the amplifier is short-circuited by closure of the contacts 80e and the rate resistor 26 is removed from the circuit by closure of the contacts 80f.

As a result of the foregoing, the reset capacitor 34 is connected in series with voltages $E_1$ and $E_2$ through a low-impedance circuit including only resistor 71. Upon return of the operation to automatic control, the charge acquired by the reset capacitor 34 will minimize change in the position of valve 12 due solely to the reestablishment of the automatic control circuits. The system will function smoothly and continuously thereafter to maintain the magnitude of the condition at the control point.

In the event the magnitude of the condition in compartment 10 attains an excessive value, the detector 15 through the mechanical connection 85 operates a cam 86 to open the primary circuit of the transformer 87 and thus deenergizes the operating circuits for the contactors 50 and 51. It also completes a circuit by way of conductor 88 for the winding 48 to energize the motor 47 in a direction to close the valve 12.

There has been illustrated in Figs. 1 and 4 an additional feature made possible by the manner in which the proportional band is adjusted, i. e., by connecting the slidewire resistor 40 between the juncture of resistors 45 and 46 and the slidewire contact 42a. With this connection the voltage applied to the slidewire 42 is constant for all positions of slidewire contact 40a. The voltage applied to the slidewire 42 is likewise constant for all positions of contact 42a. Accordingly, by including a voltage-responsive indicator, as a meter 89 in series with an adjustable high-valued resistor 90, the meter deflection will at all times be proportional to the position of valve 12. This provides a simple and reliable indication of the valve position which may be remotely located and yet entirely reliable in either automatic or manual control.

The input circuit to the amplifier in Fig. 4 slightly differs from that shown in Fig. 1, and the reason for the difference will be apparent by referring to Fig. 5. In Fig. 5 there is illustrated a ground connection at 91, and it will be seen that when the coupling capacitor 66 of the amplifier 36 is connected to the left-hand stationary contact by the converter 64, there will be applied to the input circuit a potential difference developed across resistors 72 and 26. When coupling capacitor 66 is connected to the right-hand stationary contact, the potential difference developed across reset capacitor 34, and across that fraction of the resistor 40 which develops the potential difference $E_2$, is applied to the input circuit of the amplifier. The end result as far as the response on amplifier 36 is concerned is quite similar or identical with that of Fig. 1. In Fig. 4 the amplifier responds to the difference between the potentials developed in the previously traced circuits, whereas in Fig. 1 the amplifier responds to the algebraic sum of said voltages when connected in series in the input circuit to the amplifier. In either case, the response of the amplifier is to any net potential difference in the input circuit. It is to be understood that while the circuit connections in which the reset resistor 32 and reset capacitor 34 are connected in series directly across the voltage $E_2$ have been shown only in Fig. 3 in which the proportional action signal and rate action signal are derived from separate sources, circuit connections may be utilized with the circuits of Figs. 1 and 4 where the above signals are derived from a common source.

What is claimed is:

1. In a control system for producing a condition-controlling effect to maintain the magnitude of the condition at a predetermined value, the combination of an amplifier having input terminals and output terminals, means operable in accordance with the magnitude of the condition for producing a potential difference related to the deviation of said condition from said predetermined value, feedback means connected to said output terminals for producing in said input circuit a balancing feedback signal variable in accordance with the magnitude of the output of said amplifier, a reset capacitor and a reset resistor associated with said feedback means, said reset resistor being included in a loop circuit extending from one said input terminal to said other input terminal with said potential difference introduced in series therein for developing a component of control action proportional to the time integral of the deviation of said condition from said predetermined value, a second loop circuit including said feedback means and said reset capacitor and extending between said input terminals and including at least one circuit component, means for energizing said last-named circuit component by a fractional part of said potential difference for introducing a component of control action proportional to the deviation of said condition from said predetermined value, and a final control element operable in accordance with change in the output of said amplifier for controlling the magnitude of said condition.

2. The control system of claim 1 in which said feedback means includes a bridge network having a constant-voltage source of supply, and in which said circuit means includes a potentiometer for determining the percentage of the output signal from said feedback means which is developed in said second loop circuit as said feedback signal.

3. The control system of claim 2 in which said bridge network includes a slidewire and a cooperating contact relatively adjustable in accordance with said output of said amplifier for developing said feedback signal, and a circuit including an indicator extending from said contact to one end of said slidewire for indicating the position of said final control element.

4. In a control system for producing a condition-controlling effect to maintain the magnitude of a condition at a predetermined value, the combination of an amplifier having an input circuit and an output circuit, means operable in accordance with the magnitude of the condition for producing a potential difference related to the deviation of said condition from said predetermined value, circuit means responsive to said potential difference and including in series-circuit relation with each other two resistance means, one of them being included in said input circuit of said amplifier and one being excluded from said input circuit to form a voltage divider across which said potential difference is applied, said resistors developing in said input circuit a signal proportional to said deviation, a rate capacitor associated with the resistance means excluded from said input circuit for developing in said input circuit a signal proportional to rate of change of said deviation, means for adjusting said resistance means without changing the ratio of the voltage division between them and for adjusting the magnitude of said signal proportional to said rate of change without changing the magnitude of said signal proportional to said deviation, feedback means connected to said output circuit for producing a feedback signal in said input circuit in accordance with the magnitude of the output of said amplifier, and a final control element operable in accordance with the output of said amplifier in a direction and to an extent to maintain the magnitude of said condition at said predetermined value.

5. The control system of claim 4 in which there are provided means including a reset capacitor connected in series in said input circuit for introducing a component of control action of magnitude proportional to the time integral of deviation of said magnitude of said condition from said predetermined value.

6. In a control system for producing a condition-controlling effect to maintain the magnitude of a condition at a predetermined value, the combination of an amplifier having an input circuit and an output circuit, circuit components in series-circuit relation in said input circuit, means for controlling the energization of one of said components in accordance with the deviation of said magnitude from a predetermined value for producing a proportional component of control action, means for controlling the energization of a second of said circuit components in accordance with the rate of change of said deviation for producing a rate component of control action, one of said circuit components being adjustable for varying the magnitude of the signal introduced by it into said input circuit, potentiometer means for controlling the magnitude of the signal proportional to said deviation developed by the other of said circuit components, said adjustable component in series in said input circuit being effective to change the magnitude of said rate action without affecting the magnitude of said proportional action, feedback means included in said output circuit for producing a feedback signal variable in accordance with change in the output of said amplifier, circuit means included in said input circuit for developing therein a balancing feedback signal, means intermediate said feedback means and said circuit means for developing a component of control action proportional to the time integral of deviation of said condition from said predetermined value, and a final control element operable in accordance with said components of control action as they appear in the output of said amplifier.

7. In a control system for producing a condition-controlling effect to maintain the magnitude of a condition at a predetermined value, the combination of an amplifier having an input circuit and an output circuit, a plurality of bridge networks each including at least one circuit component in said input circuit in series-circuit relation with the other circuit components, means operable in accordance with the magnitude of the condition for simultaneously adjusting an element of two of said bridges for developing output signals related to the deviation of said condition from said predetermined value, a rate capacitor associated with one of said bridges for developing in said input circuit a potential difference proportional to the rate of change of said deviation, feedback means connected to said output circuit for developing from a third of said bridges a feedback signal varying in accordance with the change in the output of said amplifier, a reset resistor and a reset capacitor associated with said third bridge network for introducing into said input circuit a component of control action proportional to the time integral of deviation of said condition from said predetermined value, each of said bridge networks including an element adjustable for varying the magnitude of the control signal produced thereby without changing the magnitude of the control signals developed by the remaining bridges, and a final control element operable in accordance with change in the output of said amplifier for maintaining the magnitude of said condition at said predetermined value.

8. The control system of claim 7 in which said third bridge includes a voltage-responsive device for indicating the position of said final control element.

9. In a control system for producing a condition-controlling effect to maintain the magnitude of the condition at a predetermined value, the combination of an amplifier having input terminals and output terminals, means operable in accordance with the magnitude of the condition of producing a potential difference related to the deviation of said condition from said predetermined value, feedback means connected to said output terminals for producing in said input circuit a balancing feedback signal variable in accordance with the magnitude of the output of said amplifier, a reset capacitor and a reset resistor associated with said feedback means, said reset resistor being included in a loop circuit extending from one said input terminal to said other input terminal with said potential difference introduced in series therein for developing a component of control action proportional to the time integral of the deviation of said condition from said predetermined value, and a second loop circuit extending between said input terminals and including circuit components energized by said potential difference for introducing components of control action, one of which is proportional to the deviation of said condition from said predetermined value and another of which is proportional to the rate of change of said deviation, and a final control element operable in accordance with change in the output of said amplifier for controlling the magnitude of said condition.

10. The control system of claim 9 in which circuit-transfer means are provided for limiting the charging voltage for said reset capacitor to approximately that developed by said feedback means, and means for operating said circuit-transfer means upon operation of said final control element to one or the other of its limits of operation and for returning said circuit-transfer means to its initial position as said magnitude of said condition changes in a direction to approach said predetermined value.

11. The control system of claim 10 in which a potentiometer is included in circuit with said circuit-transfer means, circuit connections to said potentiometer for developing the potential difference including a component proportional to the deviation of said condition from said predetermined value and a component proportional to the rate of change of said deviation for modifying the potential applied to said reset capacitor.

12. In a control system for producing a condition-controlling effect to maintain the magnitude of the condition at a predetermined value, the combination of an amplifier having input terminals and output terminals, means operable in accordance with the magnitude of the condition for producing a potential difference related to the deviation of said condition from said predetermined value, feedback means connected to said output terminals for producing in said input circuit a balancing feed-back signal variable in accordance with the magnitude of the output of said amplifier, a reset capacitor and a reset resistor, said reset resistor being included in a loop circuit which excludes said feedback means and which extends from one said input terminal to said other input terminal with said potential difference introduced in series therein for developing a component of control action proportional to the time integral of the deviation of said condition from said predetermined value, a separate loop circuit including said feedback means and extending between said input terminals and including said reset capacitor and at least two additional circuit components, means for energizing a first of said two circuit components by a fractional part of said potential difference for introducing a component of control action proportional to the deviation of said condition from said predetermined value, means for energizing from said potential difference the second of said two circuit components in accordance with the rate of change of said deviation for introducing a component of control action proportional to the rate of change of said deviation, said feedback signal having a component of rate action due to said second circuit component which in said separate loop circuit opposes that due to said second component, whereby charging and discharging of said reset capacitor is due to the magnitude of said deviation and independent of the rate of change of said deviation, and a final control element operable in accordance with change in the output of said amplifier for controlling the magnitude of said condition.

13. In a control system for producing a condition-controlling effect to maintain the magnitude of a condition at a predetermined value, the combination of an amplifier having an input circuit and an output circuit, circuit components in series-circuit relation in said input circuit, means for controlling the energization of one of said components in accordance with the deviation of said magnitude from a predetermined value for producing a proportional component of control action, means for controlling the energization of a second of said circuit components in accordance with the rate of change of said deviation for producing a rate component of control action, one of said circuit components being adjustable for varying the magnitude of the signal introduced by it into said input circuit, said adjustable component being effective to change the magnitude of the rate action without affecting the magnitude of the proportional action, feedback means included in said output circuit for producing a feedback signal variable in accordance with change in the output of said amplifier, circuit means included in said input circuit for developing therein a balancing signal from said feedback signal, means for relatively adjusting the magnitude of said balancing signal with respect to the magnitude of said feedback signal to adjust the magnitude of said proportional component, means intermediate said feedback means and said circuit means for developing from said feedback signal a component of control action propotional to the time integral of deviation of said condition from said predetermined value, and a final control element operable in accordance with said components of control action as they appear in the output of said amplifier.

References Cited in the file of this patent
UNITED STATES PATENTS
2,666,170     Davis _____ Sept. 7, 1954

UNITED STATES PATENT OFFICE
CERTIFICATE OF CORRECTION

Patent No. 2,830,244                         April 8, 1958

Elwood T. Davis

It is hereby certified that error appears in the printed specification of the above numbered patent requiring correction and that the said Letters Patent should read as corrected below.

Column 10, line 48, for "of producing" read -- for producing --.

Signed and sealed this 15th day of July 1958.

(SEAL)

Attest:

KARL H. AXLINE                                    ROBERT C. WATSON

Attesting Officer                               Commissioner of Patents